US012619356B2

(12) United States Patent
Gohain et al.

(10) Patent No.: US 12,619,356 B2
(45) Date of Patent: May 5, 2026

(54) FRAGMENTATION MANAGEMENT FOR MEMORY SYSTEMS

(71) Applicant: Micron Technology, Inc., Boise, ID (US)

(72) Inventors: Nitul Gohain, Bangalore (IN); Nicola Colella, Capodrise (IT)

(73) Assignee: Micron Technology, Inc., Boise, ID (US)

( * ) Notice: Subject to any disclaimer, the term of this patent is extended or adjusted under 35 U.S.C. 154(b) by 118 days.

(21) Appl. No.: 18/383,761

(22) Filed: Oct. 25, 2023

(65) Prior Publication Data

US 2024/0201850 A1     Jun. 20, 2024

(30) Foreign Application Priority Data

Dec. 15, 2022    (IN) .............................. 202241072538

(51) Int. Cl.
*G06F 3/00*         (2006.01)
*G06F 3/06*         (2006.01)
*G06F 16/17*        (2019.01)
(52) U.S. Cl.
CPC .......... *G06F 3/0608* (2013.01); *G06F 3/0604* (2013.01); *G06F 3/0643* (2013.01); (Continued)
(58) Field of Classification Search
CPC ......... G06F 16/1724; G06F 2206/1004; G06F 3/0608; G06F 3/064; G06F 3/0604; G06F 3/0643
See application file for complete search history.

(56) References Cited

U.S. PATENT DOCUMENTS

| | | | |
|---|---|---|---|
| 2009/0055450 A1* | 2/2009 | Biller .................. | G06F 16/1724 |
| 2013/0226881 A1* | 8/2013 | Sharma ............... | G06F 16/1748 |
| | | | 707/E17.005 |

(Continued)

FOREIGN PATENT DOCUMENTS

| | | |
|---|---|---|
| CN | 114586017 | 6/2022 |
| WO | 2022047619 | 3/2022 |
| WO | 2024129864 | 6/2024 |

OTHER PUBLICATIONS

"International Application Serial No. PCT US2023 083838, International Search Report mailed Apr. 15, 2024", 4 pages.

(Continued)

*Primary Examiner* — Reginald G Bragdon
*Assistant Examiner* — Michael L Westbrook
(74) *Attorney, Agent, or Firm* — Schwegman Lundberg & Woessner, P.A.

(57) ABSTRACT

Aspects of the present disclosure configure a system component, such as a memory sub-system controller, to provide media fragmentation management. The controller receives, from a host, a file-based-optimization (FBO) entry comprising a plurality of logical block addresses (LBAs) associated with a file. The controller accesses a page table that associates the plurality of LBAs with respective physical addresses of a set of memory components and determines a first quantity of read operations that need to be performed to read data from the physical addresses of the set of memory components associated with the plurality of LBAs. The controller computes a regression level for the file based on the first quantity of read operations relative to a second quantity of LBAs included in the plurality of LBAs.

20 Claims, 7 Drawing Sheets

500

505 — RECEIVE, FROM A HOST, A FILE-BASED-OPTIMIZATION (FBO) ENTRY COMPRISING A PLURALITY OF LOGICAL BLOCK ADDRESSES (LBAs) ASSOCIATED WITH A FILE

510 — ACCESS A PAGE TABLE THAT ASSOCIATES THE PLURALITY OF LBAs WITH RESPECTIVE PHYSICAL ADDRESSES OF A SET OF MEMORY COMPONENTS

515 — DETERMINE A FIRST QUANTITY OF READ OPERATIONS THAT NEED TO BE PERFORMED TO READ DATA FROM THE PHYSICAL ADDRESSES OF THE SET OF MEMORY COMPONENTS ASSOCIATED WITH THE PLURALITY OF LBAs

520 — COMPUTE A REGRESSION LEVEL FOR THE FILE BASED ON THE FIRST QUANTITY OF READ OPERATIONS RELATIVE TO A SECOND QUANTITY OF LBAS INCLUDED IN THE PLURALITY OF LBAs

(52) U.S. Cl.
CPC ........ G06F 3/0679 (2013.01); G06F 16/1724
(2019.01); *G06F 2206/1004* (2013.01)

(56) References Cited

U.S. PATENT DOCUMENTS

| 2013/0275650 | A1* | 10/2013 | Hida | G06F 12/0246 |
| | | | | 711/102 |
| 2014/0207997 | A1* | 7/2014 | Peterson | G06F 12/0246 |
| | | | | 711/159 |
| 2014/0229657 | A1 | 8/2014 | Karamov et al. | |
| 2015/0220552 | A1* | 8/2015 | Duzly | G06F 16/00 |
| | | | | 707/693 |
| 2016/0266826 | A1* | 9/2016 | Ooneda | G11C 29/52 |
| 2017/0228171 | A1* | 8/2017 | Huang | G06F 3/0656 |
| 2018/0032278 | A1* | 2/2018 | Hall | G06F 3/0608 |
| 2022/0197862 | A1* | 6/2022 | Yang | G06F 12/0253 |
| 2022/0283934 | A1 | 9/2022 | Zilberstein et al. | |
| 2022/0413729 | A1* | 12/2022 | Sharma | G06F 3/0659 |
| 2023/0195353 | A1* | 6/2023 | Zilberstein | G06F 3/0616 |
| | | | | 711/154 |
| 2023/0325081 | A1* | 10/2023 | Patel | G06F 3/0608 |
| | | | | 711/166 |

OTHER PUBLICATIONS

"International Application Serial No. PCT US2023 083838, Written Opinion mailed Apr. 15, 2024", 4 pages.
Longsys, "In-depth Interpretation of the FBO Feature of UFS 4.0", [Online]. Retrieved from the Internet: https: www.longsys.com about-longsys news indepth-interpretation-of-the-fbo-feature-of-ufs-4-0.html, (Sep. 21, 2022), 10 pages.

* cited by examiner

300

| PAGE TABLE | |
|---|---|
| LBA | PHYSICAL ADDRESS |
| LBA1 312 | PA1 322 |
| LBA2 314 | PA2 324 |
| LBA3 | PA7 |
| LBA4 316 | PA8 326 |
| LBA5 318 | PA10 328 |
| LBA6 | PA15 |

| D(0) |
| D(4) |
| D(8) |

⋮

414

CE2

| D(2) |
| D(6) |
| D(10) |

⋮

420

Ch 1

422

CE1

| D(1) |
| D(5) |
| D(9) |

⋮

424

CE3

| D(3) |
| D(7) |
| D(11) |

⋮

500

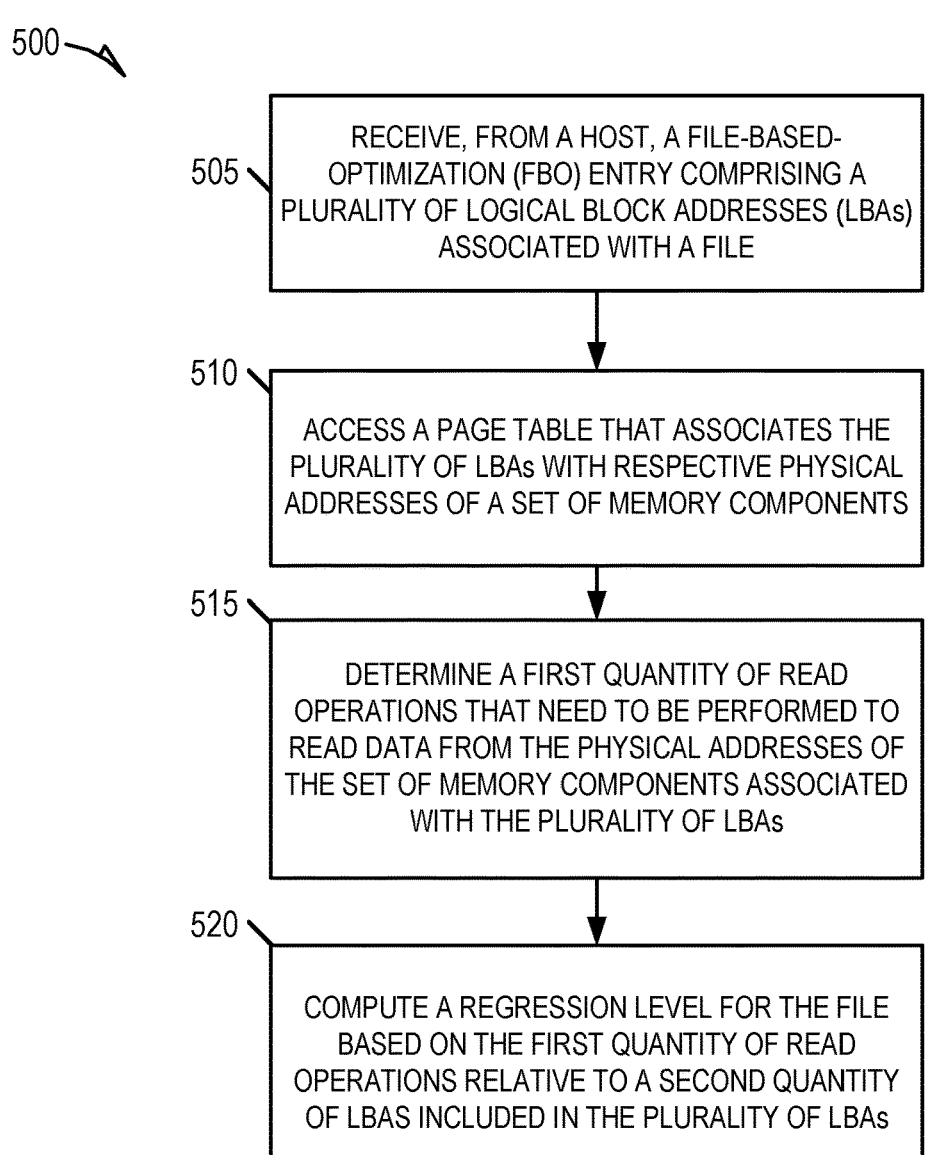

505 — RECEIVE, FROM A HOST, A FILE-BASED-OPTIMIZATION (FBO) ENTRY COMPRISING A PLURALITY OF LOGICAL BLOCK ADDRESSES (LBAs) ASSOCIATED WITH A FILE

510 — ACCESS A PAGE TABLE THAT ASSOCIATES THE PLURALITY OF LBAs WITH RESPECTIVE PHYSICAL ADDRESSES OF A SET OF MEMORY COMPONENTS

515 — DETERMINE A FIRST QUANTITY OF READ OPERATIONS THAT NEED TO BE PERFORMED TO READ DATA FROM THE PHYSICAL ADDRESSES OF THE SET OF MEMORY COMPONENTS ASSOCIATED WITH THE PLURALITY OF LBAs

520 — COMPUTE A REGRESSION LEVEL FOR THE FILE BASED ON THE FIRST QUANTITY OF READ OPERATIONS RELATIVE TO A SECOND QUANTITY OF LBAS INCLUDED IN THE PLURALITY OF LBAs

FRAGMENTATION MANAGEMENT FOR MEMORY SYSTEMS

PRIORITY APPLICATION

This application claims the benefit of priority to Indian Patent Application Serial Number 202241072538, filed Dec. 15, 2022, which is incorporated herein by reference in its entirety.

TECHNICAL FIELD

Embodiments of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 3 is a block diagram of an example page table, in accordance with some implementations of the present disclosure.

FIGS. 5A and 5B are flow diagrams of example methods to manage data fragmentation, in accordance with some implementations of the present disclosure.

DETAILED DESCRIPTION

Figure 1:
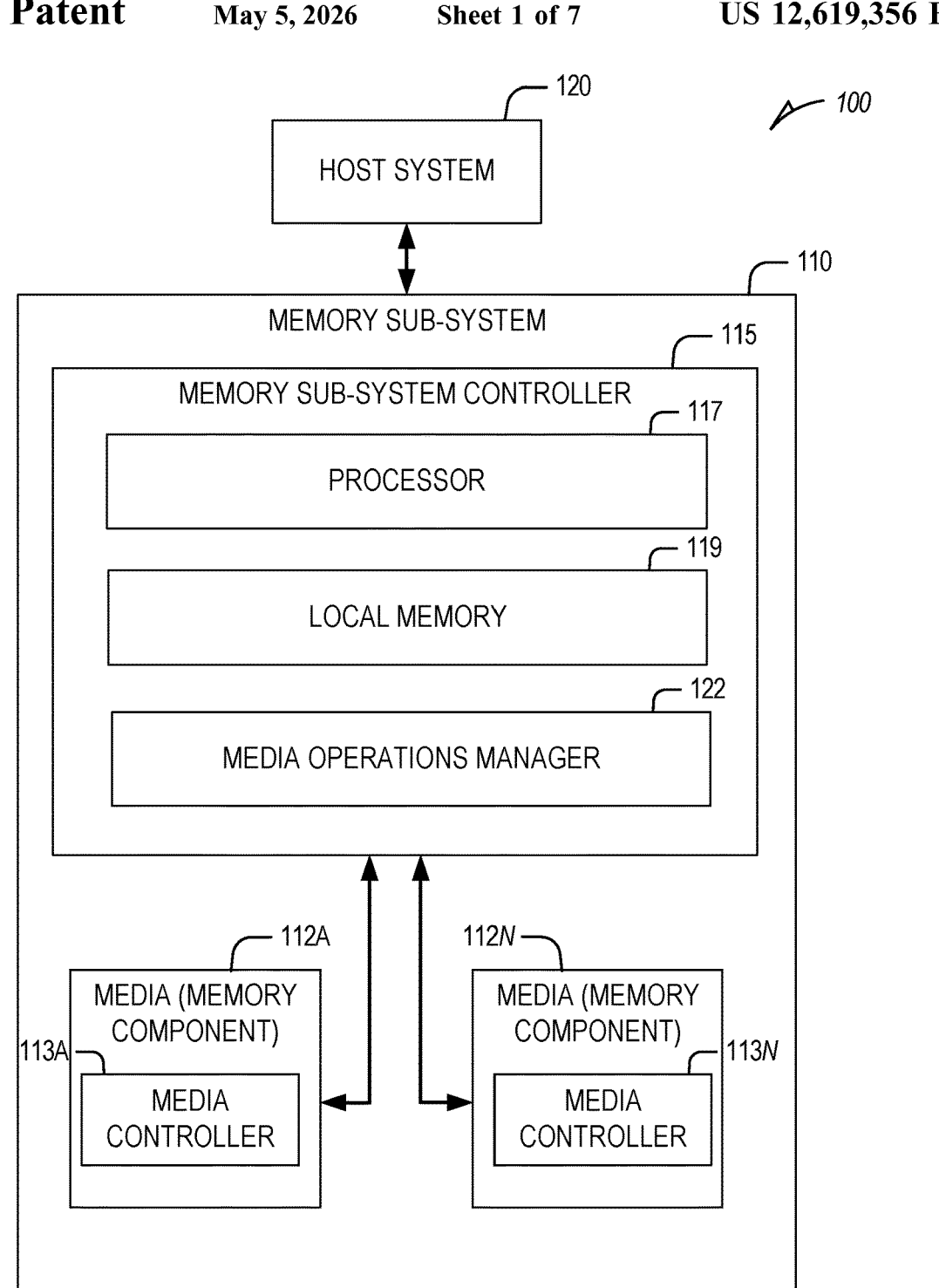
FIG. 1 is a block diagram illustrating an example computing environment including a memory sub-system, in accordance with some embodiments of the present disclosure.

Aspects of the present disclosure configure a system component, such as a memory sub-system controller, to perform different memory management operations (e.g., defragmentation operations) on different groups of memory components (e.g., memory dies) based on the respective regression levels (level of fragmentation) of files corresponding to data stored in the memory components. The memory sub-system controller can receive a file-based-optimization (FBO) entry from a host which identifies logical block addresses (LBAs) of one or more files. Using the FBO entry, the memory sub-system controller can determine a regression level of the file based on computing how many read operations need to be performed to retrieve the data from the memory components corresponding to the one or more files. The regression level can be communicated back to the host to determine whether there is a need to perform one or more defragmentation operations. For example, if the regression level transgresses a threshold regression level, the host can instruct the memory sub-system controller to de-fragment the data by copying as much of the data as possible into fewer memory blocks to reduce the number of read operations needed to be performed to read the LBAs of the one or more files. If the regression level does not transgress the threshold regression level, the memory sub-system controller may perform other types of defragmentation operations to improve the efficiency at which the data is read from the corresponding physical block addresses. By dynamically tailoring different media management operations (e.g., defragmentation operations) to the regression level of data corresponding to one or more files, the overall efficiency of operating the memory sub-system is improved.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data".

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), different defragmentation operations, and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Specifically, typical memory systems receive data from a host associated with various LBAs and store the data to free memory blocks at physical memory locations. Typically, the host does not inform the memory systems about which collection of data corresponds to which set of files. Namely, the memory sub-systems usually are unaware of which data that is stored corresponds to an individual file. Also, typically a host is unaware of how the data is arranged in the memory sub-system and specifically what physical memory addresses are mapped to the LBAs of one or more files. Because of this lack of communication between the memory sub-system and the host, data stored in the memory sub-system can remain heavily fragmented (distributed across multiple memory dies and blocks) which results in a large number of read operations needed to read a set of LBAs corresponding to an individual file. This severely degrades the efficiency and speed at which data is read from the memory sub-system.

For example, the host cannot issue instructions to the memory devices to improve performance regression to defragment or reduce the regression level of certain LBAs because the host is unaware of the current regression level of the LBAs. Also, the memory devices are unaware of which set of data stored in the memory devices is performance critical for the host, which prevents the memory controller from providing the host with the level of performance regression of such data. Without the handshaking between the host and the memory systems with respect to regression levels and LBAs information for individual files, the host is unable to instruct the memory system to execute optimization procedures to improve the regression level. This can cause the data to remain heavily fragmented and the read performance of the memory systems to be less than optimal or ideal. Current memory systems fail to provide a solution that addresses the necessary handshaking needed to address data fragmentation or regression levels.

Aspects of the present disclosure address the above and other deficiencies by providing a memory controller that can perform different memory management operations (e.g., defragmentation operations) on different groups of memory components (e.g., memory dies) based on the respective regression levels (level of fragmentation) of files corresponding to data stored in the memory components. Specifically, the memory controller can receive an FBO entry from a host which identifies LBAs of an individual file or collection of files. Using the FBO entry, the memory controller can determine a regression level of the individual file, such as by computing how many read operations need to be performed to retrieve the data from the memory relative to a maximum number of read operations that may need to be performed. The regression level can be communicated back to the host to determine whether there is a need to perform one or more defragmentation operations.

In some cases, if the regression level transgresses a threshold regression level, the host can instruct the memory sub-system controller to de-fragment the data by copying as much of the data as possible into a new memory block to reduce the number of read operations needed to be performed to read the LBAs of the one or more files. In some cases, if the regression level does not transgress the threshold regression level, the memory controller may perform other types of defragmentation operations to improve the efficiency at which the data is read from the corresponding physical block addresses, such as by re-arranging how the physical addresses corresponding to the LBAs are read concurrently from a same memory channel corresponding to a set of memory dies. By dynamically tailoring different media management operations (e.g., defragmentation operations) to the regression level of data corresponding to one or more files, the overall efficiency of operating the memory sub-system is improved which increases the efficiency of operating memory systems.

For some embodiments, the memory sub-system (e.g., memory sub-system controller) can receive, from a host, the FBO entry including a plurality of LBAs associated with a file. The memory sub-system controller accesses a page table that associates the plurality of LBAs with respective physical addresses of the set of memory components and determines a first quantity of read operations that need to be performed to read data from the physical addresses of the set of memory components associated with the plurality of LBAs. The memory sub-system controller computes a regression level for the file based on the first quantity of read operations relative to a second quantity of LBAs included in the plurality of LBAs.

In some examples, the memory sub-system controller determines the first quantity of read operations by determining whether an adjacent pair of the plurality of LBAs stored in the table is associated with non-adjacent respective physical addresses. In some examples, the memory sub-system controller identifies a plurality of adjacent pairs of the plurality of LBAs stored in the table that is each associated with respective sets of non-adjacent respective physical addresses and computes the first quantity as a function of a quantity of the identified plurality of adjacent pairs. In some examples, the memory sub-system controller determines a maximum number of read operations that need to be performed to read data associated with the plurality of LBAs. The second quantity can correspond to the maximum number. In some examples, the regression level is computed as a ratio of the first quantity of read operations to the maximum number of read operations.

In some examples, the memory sub-system controller transmits the regression level to the host in response to receiving the FBO entry. In some examples, the memory sub-system controller (or host) compares the regression level of the file to a threshold regression level and performs (or is instructed to perform by the host) one or more data defragmentation operations based on comparing the regression level of the file to the threshold regression level. In some examples, the one or more data defragmentation operations are performed in response to (the host or memory sub-system controller) determining that the regression level of the file transgresses the threshold regression level.

In some examples, the one or more data defragmentation operations include modifying a read order for the physical addresses of the set of memory components associated with the plurality of LBAs. In some examples, the memory sub-system controller modifies the read order by identifying a first set of physical addresses associated with a first set of the plurality of LBAs that corresponds to a same channel of the set of memory components as a second set of physical addresses associated with a second set of the plurality of LBAs, the first set of physical addresses corresponding to a first chip enable and the second set of physical addresses corresponding to a second chip enable on the same channel. The memory sub-system controller instructs the same channel of the set of memory components to interleave reading the second set of physical addresses based on the second chip enable with transferring data read from the first set of physical addresses to the processing device.

In some examples, the memory sub-system controller instructs the same channel of the set of memory components to read the data from the first set of physical addresses based on the first chip enable. The memory sub-system controller, after the data is read from the first set of physical addresses and while the data is transferred from the set of memory components to the processing device, instructs the same channel of the set of memory components to read data from the second set of physical addresses based on the second chip enable. In some examples, a last LBA in the first set of the plurality of LBAs is non-adjacent to a first LBA in the second set of the plurality of LBAs.

In some examples, the memory sub-system controller determines a type of storage associated with one or more of the physical addresses. The memory sub-system controller transmits, based on the comparing the regression level of the file to the threshold regression level, a first regression indicator to the host in response to determining that the type of storage associated with the one or more physical addresses is a first type and transmits, based on the comparing the regression level of the file to the threshold regression level, a second regression indicator to the host in response to determining that the type of storage associated with the one or more physical addresses is a second type. In some examples, the first type includes single level cell (SLC) storage or triple level cell (TLC) storage and the second type includes quad level cell (QLC) storage. In some examples, the second regression indicator represents the regression level and the first regression indicator represents regression that is lower than the regression level.

In some examples, the one or more data defragmentation operations include copying data associated with non-adjacent physical addresses of the physical addresses associated with the plurality of LBAs to a new virtual block or superblock. In some examples, the memory sub-system controller determines that a quantity of free virtual blocks resulting from copying the data into the new virtual block is reduced below a threshold and delays copying the data until the quantity of free virtual blocks transgresses the threshold. In some examples, the memory sub-system controller determines that less than all of the new virtual block is populated by the copied data of the plurality of LBAs. In response to determining that less than all of the new virtual block is populated by the copied data of the plurality of LBAs, the memory sub-system controller adds other data associated with different LBAs to remaining portions of the new virtual block. The other data can include data that is in garbage collection and/or data from another FBO entry.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. In some examples, the memory cells of the memory components 112A to 112N can be grouped into a set of different zones or virtual blocks (VB) of equal or unequal size used to store data for corresponding applications. In such cases, each application can store data in an associated zone of the set of different zones.

The memory sub-system controller 115 can communicate with the memory components 112A to 112N to perform operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, different near miss ECC operations, different defragmentation operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify regression levels and/or regression thresholds for the memory components 112A to 112N. In some examples, the memory sub-system controller 115 can provide or transmit commands or operations to the host system 120 specifying regression levels and/or regression thresholds for collections of LBAs associated with FBO entries stored in the memory components 112A to 112N.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to selectively and adaptively perform different memory management operations (e.g., defragmentation operations) on the memory components 112A to 112N on the basis of the regression levels of the FBO entries associated with the respective memory components 112A to 112N. For example, the media operations manager 122 can receive an FBO entry from the host system 120 which identifies LBAs of an individual file or collection of files. Using the FBO entry, the memory sub-system controller 115 can determine a regression level of the individual file, such as by computing how many read operations need to be performed to retrieve the data from the memory relative to a maximum number of read operations that may need to be performed. The regression level can be communicated back to the host system 120 to determine whether there is a need to perform one or more defragmentation operations. In some cases, the defragmentation operations are selectively performed on the basis of the type of memory used to store the data for the FBO entry. Namely, if the data is stored in the TLC or SLC memory type, the regression level can be communicated back to the host as being lower than the actual regression level to prevent performing defragmentation operations. If the data is stored in the QLC memory type, the regression level can be communicated back to the host as being the actual regression level to cause performing defragmentation operations.

In some examples, the memory sub-system controller 115 compares the regression level of the FBO entry to a regression level threshold. The memory sub-system controller 115 can determine that the regression level transgresses the threshold. On the basis of whether the regression level transgresses the threshold, the memory sub-system controller 115 can perform one or more data defragmentation operations. The data defragmentation operations can include rearranging how physical addresses mapped to the LBAs of the FBO entry are read from one or more of the memory components 112A-N. The data defragmentation operations can include copying data of the FBO entry that is distributed across many VBs on the memory components 112A-N into fewer VBs or into a single VB to reduce the number of reads that are needed to be performed to read the data corresponding to the FBO entry. In some cases, the data is only copied into a new VB if the quantity of available free VBs is below a threshold quantity. If not, the memory sub-system controller 115 can delay copying the data into the new VB until the number of available free VBs transgresses the threshold quantity.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
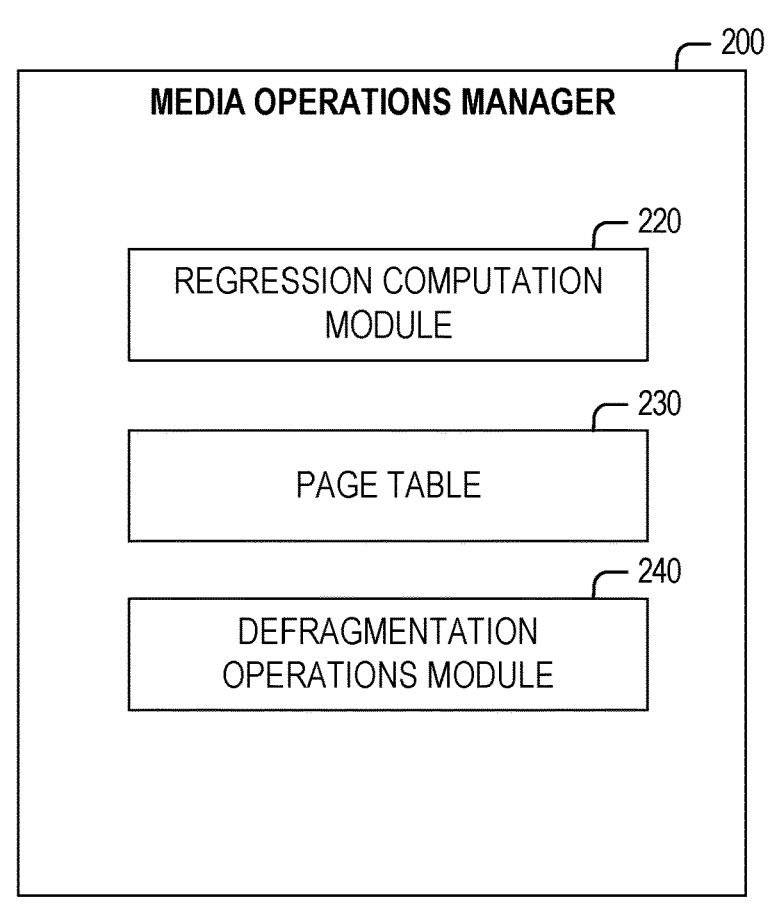
FIG. 2 is a block diagram of an example media operations manager, in accordance with some implementations of the present disclosure.

FIG. 2 is a block diagram of an example media operations manager 200, in accordance with some implementations of the present disclosure. As illustrated, the media operations manager 122 includes regression computation module 220, a page table 230, and a defragmentation operations module 240. For some embodiments, the media operations manager 122 can differ in components or arrangement (e.g., less or more components) from what is illustrated in FIG. 2.

The media operations manager 200 receives from the host system 120 an FBO entry that lists a plurality of LBAs of an individual file. In response to receiving the FBO entry, the regression computation module 220 accesses the page table 230 to identify a list of physical addresses that are mapped to each respective LBA in the FBO entry. The regression computation module 220 computes a regression level for the FBO entry by analyzing the arrangement of the identified physical addresses. Namely, the regression computation module 220 computes how many total read operations need to be performed to read the data from all of the identified physical addresses relative to the maximum amount of read operations that need to be performed.

Specifically, the regression computation module 220 can determine a worst-case-scenario for fragmentation of the data corresponding to the FBO entry. This can be the case when each LBA of the FBO is associated with a physical address (e.g., page) that is in a different VB. Namely, the data of the FBO entry can be stored across a quantity of VBs corresponding to the number of LBAs in the FBO. In such worst-case-scenarios, the memory sub-system controller 115 may need to perform a maximum number of read operations corresponding to the number of LBAs in the FBO to obtain all the data for the FBO entry. For example, if the FBO entry includes 10 LBAs, the worst-case-scenario for reading the data corresponding to the FBO entry is performing a maximum of 10 reads to access 10 different VBs from the memory components 112A-N.

The regression computation module 220 can compute the total actual number of read operations needed to be performed to read the data corresponding to the FBO entry by determining how many VBs are used to store the data corresponding to the FBO entry. In some cases, the regression computation module 220 can traverse the identified list of physical addresses corresponding to the plurality of LBAs. In response to determining that a first LBA corresponds to a first physical address that is not adjacent to a second physical address corresponding to a second LBA that is sequentially adjacent to the first LBA, the regression computation module 220 can increment a counter representing the number of reads. This can be because reading the non-adjacent physical address can require an additional read to be performed. In this way, the regression computation module 220 identifies pairs of adjacent LBAs in the page table 230 corresponding to the FBO entry that corresponds to non-adjacent physical addresses. The regression computation module 220 computes the number of read operations that need to be performed to read the data corresponding to the FBO entry (e.g., the first quantity) as a function of a quantity of the identified plurality of adjacent pairs. The regression computation module 220 can compute the regression level for the FBO as a ratio of the first quantity of read operations to the maximum number of read operations and can provide this regression level back to the host system 120.

FIG. 3 is a block diagram of an example page table 300, in accordance with some implementations of the present disclosure. The regression computation module 220 can communicate with the page table 230 to obtain the page table 300 corresponding to the FBO entry received from the host system 120. The page table 300 can include a list of LBAs 310 corresponding to the FBO entry and their respective physical addresses 320. The regression computation module 220 can determine that the first LBA1 312 is adjacent to the second LBA2 314. The regression computation module 220 can determine that the first physical address (PA1) 322 corresponding to the first LBA1 312 is adjacent to the second physical address (PA2) 324 corresponding to the second LBA2 314. In such cases, the regression computation module 220 determines that the same read operation can be performed to obtain the data for the first LBA1 312 and the second LBA2 314.

The regression computation module 220 can determine that a third LBA4 316 is adjacent to the fourth LBA5 318. The regression computation module 220 can determine that the third physical address (PA8) 326 corresponding to the third LBA 4 316 is not adjacent to the fourth physical address PA10 328 corresponding to the fourth LBA5 318. In such cases, the regression computation module 220 determines that the two read operations need to be performed to obtain the data for the third LBA4 316 and the fourth LBA5 318. In response, the regression computation module 220 updates or increments a counter of the number of reads that need to be performed to obtain the data for the FBO entry. After completely traversing or processing the LBAs 310 for the FBO entry, the regression computation module 220 uses the current value of the counter as the first quantity of reads that need to be performed to read the data corresponding to the FBO entry. The regression computation module 220 computes a regression level for the FBO entry as a function of the first quantity and the worst-case-scenario maximum number of read operations that need to be performed to read the data corresponding to the FBO entry. The regression computation module 220 can return this regression level to the host system 120.

In some cases, the regression computation module 220 provides the regression level to the defragmentation operations module 240. The defragmentation operations module 240 can compare the regression level to a regression level threshold (which can be provided by the host system 120). The defragmentation operations module 240 can perform one or more defragmentation operations based on the current regression level of the data corresponding to the FBO entry. In some cases, the defragmentation operations module 240 performs one or more data defragmentation operations in response to determining that the regression level of the file transgresses the threshold regression level.

For example, the defragmentation operations module 240 can modify a read order for the physical addresses of the set of memory components associated with the plurality of LBAs as one of the defragmentation operations. Specifically, the defragmentation operations module 240 identifies a first set of physical addresses associated with a first set of the plurality of LBAs that corresponds to a same channel of the set of memory components 112A-N as a second set of physical addresses associated with a second set of the plurality of LBAs, the first set of physical addresses corresponding to a first chip enable and the second set of physical addresses corresponding to a second chip enable on the same channel. The defragmentation operations module 240 instructs the same channel of the set of memory components 112A-N to interleave reading the second set of physical addresses based on the second chip enable with transferring data read from the first set of physical addresses to the memory sub-system controller 115.

In some cases, the defragmentation operations module 240 instructs the same channel of the set of memory components 112A-N to read the data from the first set of physical addresses based on the first chip enable. The defragmentation operations module 240 after the data is read from the first set of physical addresses and while the data is transferred from the set of memory components to the memory sub-system controller 115, instructs the same channel of the set of memory components 112A-N to read data from the second set of physical addresses based on the second chip enable. A last LBA in the first set of the plurality of LBAs can be non-adjacent to a first LBA in the second set of the plurality of LBAs.

Figure 4:
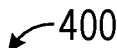
FIG. 4 is a block diagram of an example set of channels for multiple memory dies, in accordance with some implementations of the present disclosure.

FIG. 4 is a block diagram 400 of an example set of channels for multiple memory dies, in accordance with some implementations of the present disclosure. Each memory die shown in FIG. 4 can correspond to a different one of the set of memory components 112A-N. In some examples, the defragmentation operations module 240 can virtually defragment the data associated with the FBO entry by controlling the order at which the physical addresses corresponding to the LBAs are read from the memory components 112A-N. So rather than reading the second physical address 324 corresponding to the second LBA 314 after reading the data corresponding to the first physical address 322, the defragmentation operations module 240 can read the data from the third physical address 326 after reading the data from the first physical address 322. This can be performed if the defragmentation operations module 240 determines that the third physical address 326 is in a same channel as the first physical address 322 and on a different memory component 112A-N. Namely, the defragmentation operations module 240 can determine that the third physical address 326 is on the same channel as the first physical address 322 and not on the same channel as the second physical address 324. In such cases, the defragmentation operations module 240 can interleave reading the data from the third physical address 326 with reading the data from the first physical address 322.

Specifically, the defragmentation operations module 240 can determine that the third physical address 326 corresponding to the third LBA 316 is not adjacent to the fourth physical address 328 corresponding to the fourth LBA 318. In addition, the defragmentation operations module 240 can determine that the third physical address 326 and the fourth physical address 328 correspond to different memory components 112A-N of the same channel. Specifically, the defragmentation operations module 240 can determine that the third physical address 326 corresponds to a first chip enable 412 of a first memory component 112A and the fourth physical address 328 corresponds to a second chip enable 414 of a second memory component 112N. The defragmentation operations module 240 can also determine that the first and second memory components 112A and 112N are on a same channel 410 of the memory sub-system.

In such cases, the defragmentation operations module 240 can interleave reading the data from the third physical address 326 with the data from the fourth physical address 328. This can reduce the amount of time it takes to retrieve and read the data from the same channel 410. Namely, the defragmentation operations module 240 can instruct the first memory component 112A (using the first chip enable 412) to read the data corresponding to the third physical address 326. After the data is read from the third physical address 326 and while the data is being transferred to the memory sub-system controller 115, the memory sub-system controller 115 instructs the same channel 410 to read the data corresponding to the fourth physical address 328 from the second memory component 112N (using the second chip enable 414). In this way, the memory sub-system controller 115 does not have to wait for the transfer of the data corresponding to the third physical address 326 to be completed before the data corresponding to the fourth physical address 328 is initiated which reduces the overall amount of lag experienced by the memory sub-system controller 115.

The defragmentation operations module 240 can perform similar operations to interleave data read from a second channel 420 that includes memory components 112C and 112D (not shown) corresponding to other chip enables 422 and 424. This reduces the overall amount of lag experienced by the memory sub-system controller 115 which virtually defragments the data.

In some examples, the defragmentation operations module 240 (or host system 120) can determine that the regression level of the FBO entry transgresses a regression level threshold. The defragmentation operations module 240 can determine or receive an instruction from the host system 120 to actively defragment the data corresponding to the FBO entry. To do so, the defragmentation operations module 240 can determine how many free VBs are currently available. The defragmentation operations module 240 can determine that the number of free VBs that are available transgresses a threshold. The defragmentation operations module 240 can compute how many VBs are needed to defragment or store all of the data corresponding to the FBO entry. The defragmentation operations module 240 can decrement the needed number of VBs from the current available number of free VBs. The defragmentation operations module 240 can determine whether the decremented number still transgresses the threshold. If so, the defragmentation operations module 240 can copy all of the data corresponding to the FBO entry into the free VBs and update the page table 300. In some cases, the defragmentation operations module 240 can compute the minimum LBA start and maximum length of the FBO entry to determine the number of VBs needed to store the data corresponding to the FBO entry.

If the decremented number no longer transgresses the threshold, the defragmentation operations module 240 can delay copying the data to the free VBs until the number of free VBs minus the number of needed VBs to store the data corresponding to the FBO entry transgresses the threshold.

In some examples, the defragmentation operations module 240 determines that a single VB is larger than the available data corresponding to the FBO entry. Namely, the FBO entry includes LBAs that can fit into several VBs but at least one of the VBs remains with available free space. For example, the FBO entry can include 100 LBAs and each VB can store 30 pages. In such cases, the FBO entry can be divided into four VBs but the fourth VB will have 10 pages left empty. Rather than populating the empty pages with dummy data, the defragmentation operations module 240 can populate the remaining space of the VB with data corresponding to a different FBO entry, system data, and/or data that is in a VB that is in garbage collection. In some cases, the defragmentation operations module 240 can close out the VB that is partially empty after a threshold period of time by populating the empty space with dummy data to avoid locking up the memory system.

Figure 5B:
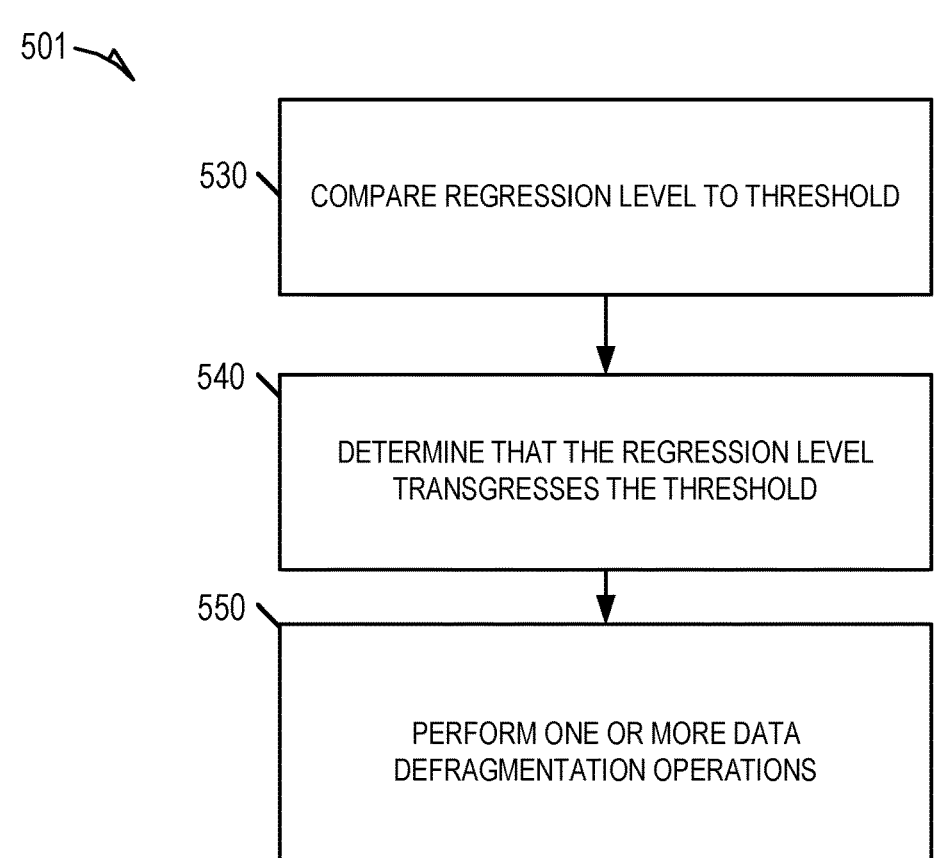

FIGS. 5A and 5B are flow diagrams of example methods 500 and 501 to manage data fragmentation, in accordance with some implementations of the present disclosure. The methods 500 and 501 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the methods 500 and 501 are performed by the media operations manager 122 of FIG. 1. Although the processes are shown in a particular sequence or order, unless otherwise specified, the order of the processes can be modified. Thus, the illustrated embodiments should be understood only as examples. The illustrated processes can be performed in a different order and some processes can be performed in parallel. Additionally, one or more processes can be omitted in various embodiments. Thus, not all processes are required in every embodiment. Other process flows are possible.

Referring now FIG. 5A, the method (or process) 500 begins at operation 505, with a media operations manager 122 (e.g., memory sub-system controller 115) of a memory sub-system (e.g., memory sub-system 110) receiving, from the host system 120, an FBO entry that includes a plurality of LBAs associated with a file. Then, at operation 510, the memory sub-system controller 115 accesses a page table that associates the plurality of LBAs with respective physical addresses of a set of memory components 112A-N and, at operation 515, the memory sub-system controller 115 determines a first quantity of read operations that need to be performed to read data from the physical addresses of the set of memory components associated with the plurality of LBAs. Thereafter, at operation 520, the memory sub-system controller 115 computes a regression level for the file based on the first quantity of read operations relative to a second quantity of LBAs included in the plurality of LBAs.

Referring now FIG. 5B, the method (or process) 501 begins at operation 530, with a media operations manager 122 (e.g., memory sub-system controller 115) of a memory sub-system (e.g., memory sub-system 110) comparing the regression level to a threshold. Then, at operation 540, the memory sub-system controller 115 determines that the regression level transgresses the threshold and, at operation 550, the memory sub-system controller 115 performs one or more data defragmentation operations to defragment or virtually defragment the data corresponding to the FBO entry.

Figure 6:
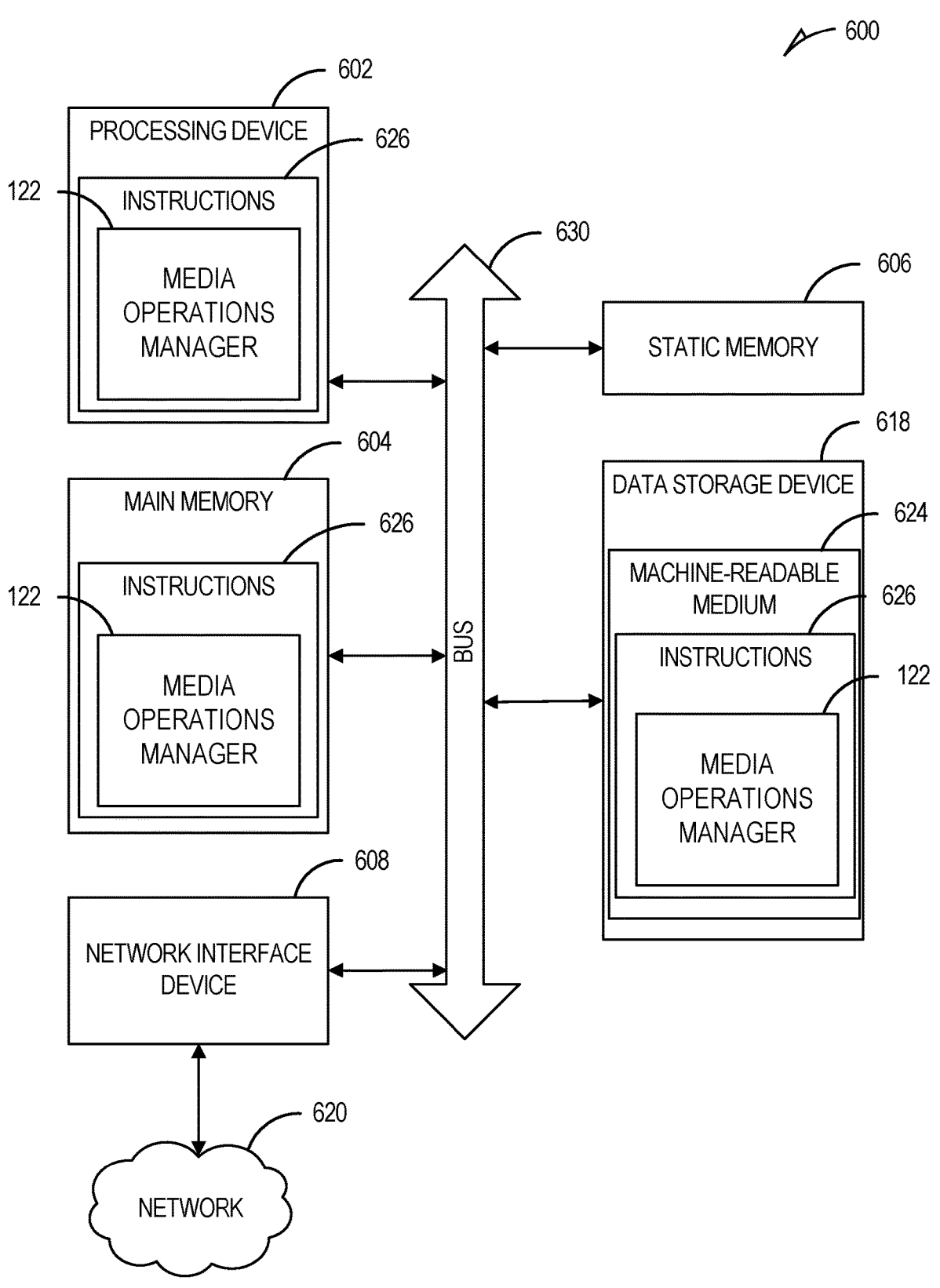
FIG. 6 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 implement functionality corresponding to the media operations manager 122 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a set of memory components of a memory sub-system; and
   a processing device operatively coupled to the set of memory components, the processing device being programmed to perform operations comprising:
   receiving, from a host, a file-based-optimization (FBO) entry comprising a plurality of logical block addresses (LBAs) associated with a file;

accessing a page table that associates the plurality of LBAs with respective physical addresses of the set of memory components;

determining a first quantity of read operations that need to be performed to read data from the physical addresses of the set of memory components associated with the plurality of LBAs;

determining a second quantity of LBAs representing how many LBAs are included among the plurality of LBAs; and computing a regression level for the file based on the first quantity of read operations that need to be performed to read data relative to the second quantity of LBAs that represent how many LBAs are included among the plurality of LBAs, the regression level computed as a ratio of the first quantity of read operations to a maximum number of read operations that need to be performed to read data associated with the plurality of LBAs.

2. The system of claim 1, wherein the operations for determining the first quantity of read operations comprise:

determining whether an adjacent pair of the plurality of LBAs stored in the page table is associated with non-adjacent respective physical addresses, the first quantity of read operations being computed based on determining that the adjacent pair is associated with the non-adjacent respective physical addresses.

3. The system of claim 1, the operations comprising:

identifying a plurality of adjacent pairs of the plurality of LBAs stored in the table that is each associated with respective sets of non-adjacent respective physical addresses; and computing the first quantity of read operations as a function of a quantity of the identified plurality of adjacent pairs.

4. The system of claim 1, the operations comprising:

determining the maximum number of read operations that need to be performed to read the data associated with the plurality of LBAs, wherein the second quantity of LBAs corresponds to the maximum number of read operations.

5. The system of claim 1, the operations comprising:

transmitting the regression level to the host in response to receiving the FBO entry.

6. The system of claim 1, the operations comprising:

performing one or more data defragmentation operations based on comparing the regression level of the file to a threshold regression level comprising:

identifying a first set of physical addresses associated with a first set of the plurality of LBAs that corresponds to a same channel of the set of memory components as a second set of physical addresses associated with a second set of the plurality of LBAs, the first set of physical addresses corresponding to a first chip enable and the second set of physical addresses corresponding to a second chip enable on the same channel; and instructing the same channel of the set of memory components to interleave reading the second set of physical addresses based on the second chip enable with transferring data read from the first set of physical addresses to the processing device.

7. The system of claim 1, the operations comprising:

comparing the regression level of the file to a threshold regression level; and performing one or more data defragmentation operations based on comparing the regression level of the file to the threshold regression level.

8. The system of claim 7, wherein the one or more data defragmentation operations are performed in response to determining that the regression level of the file transgresses the threshold regression level.

9. The system of claim 7, wherein the one or more data defragmentation operations comprise modifying a read order for the physical addresses of the set of memory components associated with the plurality of LBAs.

10. The system of claim 9, wherein modifying the read order comprises:

identifying a first set of physical addresses associated with a first set of the plurality of LBAs that corresponds to a same channel of the set of memory components as a second set of physical addresses associated with a second set of the plurality of LBAs, the first set of physical addresses corresponding to a first chip enable and the second set of physical addresses corresponding to a second chip enable on the same channel; and instructing the same channel of the set of memory components to interleave reading the second set of physical addresses based on the second chip enable with transferring data read from the first set of physical addresses to the processing device.

11. The system of claim 10, the operations comprising:

instructing the same channel of the set of memory components to read the data from the first set of physical addresses based on the first chip enable; and after the data is read from the first set of physical addresses and while the data is transferred from the set of memory components to the processing device, instructing the same channel of the set of memory components to read data from the second set of physical addresses based on the second chip enable.

12. The system of claim 10, wherein a last LBA in the first set of the plurality of LBAs is non-adjacent to a first LBA in the second set of the plurality of LBAs.

13. The system of claim 7, the operations comprising:

determining a type of storage associated with one or more of the physical addresses;

transmitting, based on the comparing the regression level of the file to the threshold regression level, a first regression indicator to the host in response to determining that the type of storage associated with the one or more physical addresses is a first type; and transmitting, based on the comparing the regression level of the file to the threshold regression level, a second regression indicator to the host in response to determining that the type of storage associated with the one or more physical addresses is a second type.

14. The system of claim 7, wherein the one or more data defragmentation operations comprise copying data associated with non-adjacent physical addresses of the physical addresses associated with the plurality of LBAs to a new virtual block.

15. The system of claim 14, the operations comprising:

determining that a quantity of free virtual blocks resulting from copying the data into the new virtual block is reduced below a threshold.

16. The system of claim 14, the operations comprising:

determining that less than all of the new virtual block is populated by the copied data of the plurality of LBAs; and in response to determining that less than all of the new virtual block is populated by the copied data of the plurality of LBAs, placing other data associated with different LBAs into remaining portions of the new virtual block.

17. A method comprising:

receiving, from a host, a file-based-optimization (FBO) entry comprising a plurality of logical block addresses (LBAs) associated with a file;

accessing a page table that associates the plurality of LBAs with respective physical addresses of a set of memory components;

determining a first quantity of read operations that need to be performed to read data from the physical addresses of the set of memory components associated with the plurality of LBAs; and determining a second quantity of LBAs representing how many LBAs are included among the plurality of LBAs; and computing a regression level for the file based on the first quantity of read operations that need to be performed to read data relative to the second quantity of LBAs that represent how many LBAs are included among the plurality of LBAs, the regression level computed as a ratio of the first quantity of read operations to a maximum number of read operations that need to be performed to read data associated with the plurality of LBAs.

18. A non-transitory computer-readable storage medium comprising instructions that, when executed by a processing device, cause the processing device to perform operations comprising:

receiving, from a host, a file-based-optimization (FBO) entry comprising a plurality of logical block addresses (LBAs) associated with a file;

accessing a page table that associates the plurality of LBAs with respective physical addresses of a set of memory components;

determining a first quantity of read operations that need to be performed to read data from the physical addresses of the set of memory components associated with the plurality of LBAs; and determining a second quantity of LBAs representing how many LBAs are included among the plurality of LBAs; and computing a regression level for the file based on the first quantity of read operations that need to be performed to read data relative to the second quantity of LBAs that represent how many LBAs are included among the plurality of LBAs, the regression level computed as a ratio of the first quantity of read operations to a maximum number of read operations that need to be performed to read data associated with the plurality of LBAs.

19. A system comprising:

a set of memory components of a memory sub-system; and a processing device operatively coupled to the set of memory components, the processing device being programmed to perform operations comprising:

performing one or more data defragmentation operations based on comparing a regression level of a file to a threshold regression level;

identifying a first set of physical addresses associated with a first set of a plurality of logical block addresses (LBAs) that corresponds to a same channel of the set of memory components as a second set of physical addresses associated with a second set of the plurality of LBAs, the first set of physical addresses corresponding to a first chip enable and the second set of physical addresses corresponding to a second chip enable on the same channel; and instructing the same channel of the set of memory components to interleave reading the second set of physical addresses based on the second chip enable with transferring data read from the first set of physical addresses to the processing device.

20. A system comprising:

a set of memory components of a memory sub-system; and a processing device operatively coupled to the set of memory components, the processing device being programmed to perform operations comprising:

determining a type of storage associated with one or more of physical addresses;

transmitting, based on comparing a regression level of a file to a threshold regression level, a first regression indicator to a host system in response to determining that the type of storage associated with the one or more physical addresses is a first type; and transmitting, based on the comparing the regression level of the file to the threshold regression level, a second regression indicator to the host system in response to determining that the type of storage associated with the one or more physical addresses is a second type.

* * * * *